Jan. 8, 1935.  H. G. FLORY ET AL  1,987,554
VARIABLE VELOCITY RATIO DEVICE
Filed Jan. 6, 1932
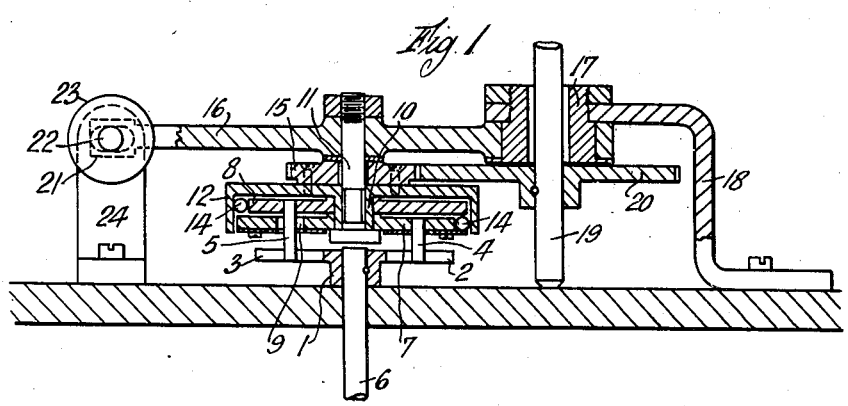
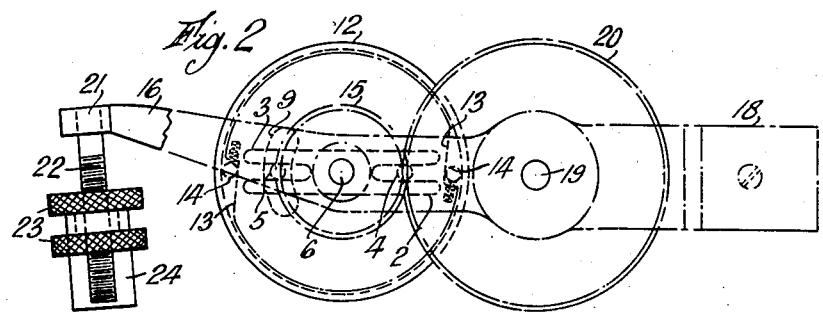
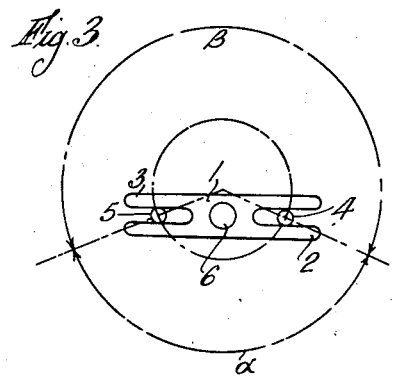

Patented Jan. 8, 1935

1,987,554

UNITED STATES PATENT OFFICE 1,987,554

VARIABLE VELOCITY RATIO DEVICE

Harry Gunn Flory and Samuel George Coley, Luton, England, assignors to George Kent, Limited, London, England Application January 6, 1932, Serial No. 585,140
In Great Britain September 24, 1931

5 Claims. (Cl. 74—112)

This invention relates to improvements in variable velocity ratio devices.

According to the present invention, there are provided a plurality of angularly displaced driving surfaces, rotatable about a common axis, a plurality of angularly displaced driven surfaces, rotatable about a common axis and each co-operating with a driving surface in such manner that relative radial movement is permitted therebetween, means for moving the axes of rotation of the driving and driven surfaces from a position concentric to a position eccentric relatively to each other, and one way drive devices for transmitting drive from the driven surfaces to a member to be driven.

The invention is illustrated in the accompanying drawing in which Figure 1 is a vertical section, Figure 2 a plan view with certain of the parts omitted and Figure 3 a diagram.

In the form illustrated there are provided two groups of driving and intermediate driven surfaces which are displaced through 180°. The groups comprise a driving member 1 having therein two forks 2, 3 providing driving surfaces and pins 4, 5, which extend into the forks the two forks being arranged at 180° with respect to each other on a driving spindle 6. One pin 4 is secured at 180° with respect to the other 5 to a lower disc 7 and the other pin 5 is secured to an upper disc 8 and passes through an arcuate circumferentially extending slot 9 formed in the lower disc 7. The discs 7 and 8 constitute separate intermediate driven means which are independently rotatable about a common axis, and the pins 4 and 5 respectively carried by the discs 7 and 8 constitute separate intermediate driven surfaces rotatable about the common axis of the discs 7 and 8.

The discs 7, 8 which are loosely mounted on a bush 10 carried by a second spindle 11, are housed within a member to be driven or ring 12 and are provided on their periphery with inclined linear surfaces 13 which constitute with the internal periphery of the ring 12 wedge shaped gaps in which are located spring pressed balls 14 acting as friction grip one way drive devices or slip clutches between the discs 7, 8 and the ring 12.

The ring 12 has secured to it a gear wheel 15 which together with the ring 12 is rotatably mounted on the second spindle 11 which latter is supported by a bracket 16 pivotally mounted on a sleeve 17 carried by a fixed bracket 18. The sleeve 17 is located co-axially around a third or driven spindle 19 which is fast with a gear wheel 20 in mesh with the gear wheel 15 secured to the ring 12. The bracket 16 carrying the second spindle 11 has an extension 21 provided with a screw threaded rod 22 engaging adjusting lock nuts 23 carried by a fixed support 24, so that by rotation of the nuts the bracket 16 can be caused to pivot about the sleeve 17 to move the axis of the second spindle 11 from a position co-axial with respect to the axis of the driving spindle 6 to a position eccentric with respect thereto.

When the second spindle 11 and the driving spindle 6 are co-axial, both discs 7, 8 are rotated at the same speed as the forks 2, 3 and hence of the driving spindle 6 and both discs transmit rotation from the forks to the ring 12 and hence to the driven spindle 19, the ratio between the speed of rotation of the driving and driven spindles 6 and 19 respectively being that determined by the gear wheels 15, 20.

If now the bracket 16 carrying the second spindle 11 be moved by the adjusting nuts so as to move the spindle 11 from a position concentric to a position eccentric with respect to the driving spindle 6 there will, during rotation, be a relative radial movement between the forks 2, 3 and pins 4, 5 so that the radius of the pins from the axis of the driving spindle 6 will vary from a minimum, when the fork and pin are on that side of the axis of the driving spindle which is opposite the eccentricity, to a maximum when the fork and pin are on the same side of the axis as the eccentricity, the pins sliding in the forks (i. e. moving radially) to adjust themselves to the eccentricity: thus the speed of rotation of the discs 7, 8 will vary from a minimum (which is lower than the speed of rotation of the driving spindle) to a maximum (which is greater than the speed of rotation of the driving spindle) for each revolution of the driving spindle at a constant rate; this occurs for the reason that while the driving spindle is moving through 180° of its rotation, one of the pins will travel through a smaller angle indicated at $\alpha$ in Figure 3 (depending on the degree of eccentricity) and then while the spindle is moving through the next 180°, the pin will be caused to travel through an angle indicated at $\beta$ in Figure 3 greater than 180°. As, however, the fork and pin of one disc are displaced through 180° with respect to those of the other disc, the maximum and minimum phases of the discs will also be displaced through 180°, i. e. while one disc is moving at a speed greater than that of the driving spindle the other disc will be moving at a slower rate so that during each revolution of the driving spindle one or other of the discs will be moving at a greater rate than that of the spindle. The discs thus being driven at cyclically varying speeds, the ring will be driven alternately first by one and then by the other disc as they successively enter their maximum speed phase, the provision of the one way drive devices enabling the ring 12 to over-run the slower moving disc.

The values of the maximum and minimum phases will of course depend upon the amount of eccentricity and thus a variation in speed ratio is effected by moving the frame 16 carrying the second spindle 11.

Obviously any desired number of forks, pins and discs may be employed, the displacement being proportional to the number provided. It is obvious that the drive can be in the reverse direction from that described herein, so that the ring 12 will function as a driving member and the spindle 6 will be the driven member.

Obviously the ball one way drive devices may be replaced by any other means such as rollers, pawls, ratchets or cone clutches.

What we claim is:—

1. In a variable velocity ratio device, the combination of a rotary member; a plurality of coaxial discs; independent driving connections between said rotary member and said discs; means adapted to have driving connection with said discs; one-way drive devices frictionally engageable with said discs and said means; and a rockable bracket for mounting said means and said discs for independent rotation coaxially with respect to each other and eccentrically with respect to said rotary member.

2. In a variable velocity ratio device, the combination of a rotary member; a plurality of coaxial discs; independent driving connections between said rotary member and said discs; means adapted to have driving connection with said discs; a first gear fixed to and coaxial with said means; one-way drive devices frictionally engageable with said discs and said means; a rockable bracket for mounting said means and said discs for independent rotation coaxially with respect to each other and eccentrically with respect to said rotary member; a pivot about which said bracket is rockable; and a second gear mounted on said pivot and engaging said first gear.

3. In a variable velocity ratio device, the combination of a spindle; a fork member at one end of the spindle provided with spaced radially extending slots; a second spindle having its axis parallel to the axis of the first named spindle; a plurality of discs journalled for rotation about said second spindle independently of each other, that disc adjacent said fork member being formed with a circumferentially extending opening; a pin secured to said disc and extending into one of the slots of said fork member; a pin secured to the next adjacent disc and extending through said circumferentially extending opening into another slot in said fork member; a member journalled for rotation on said second spindle and including a ring portion surrounding said discs in common; and one way drive devices interposed between said ring portion and said discs.

4. In a variable velocity ratio device, the combination of a spindle; a fork member at one end of the spindle provided with spaced radially extending slots; a second spindle having its axis parallel to the axis of the first named spindle; a plurality of discs journalled for rotation about said second spindle independently of each other, that disc adjacent said fork member being formed with a circumferentially extending opening; a pin secured to said disc and extending into one of the slots of said fork member; a pin secured to the next adjacent disc and extending through said circumferentially extending opening into another slot in said fork member; a member journalled for rotation on said second spindle and including a ring portion surrounding said discs in common; one way drive devices interposed between said ring portion and said discs; a fixed bracket; a shiftable bracket pivoted on said fixed bracket for swinging movements in a plane perpendicular to the axes of said spindles, one of said spindles being secured to said shiftable bracket; a third spindle journalled for rotation about the axis about which said shiftable bracket is movable; a gear wheel connected to the spindle which is mounted on said shiftable bracket; and a cooperating gear wheel mounted on said third spindle.

5. In a variable velocity ratio device, the combination of a rotary member; a plurality of coaxial discs, one of which is formed with a circumferentially extending slot and is disposed between another of said discs and said rotary member; a driving connection between said rotary member and said slotted disc; an independent driving connection extending from said other disc through said slot to said rotary member; a rotary element adapted to have driving connection with said discs; one-way drive devices frictionally engageable with said discs and said rotary element; a member for mounting said rotary element and said discs for independent rotation coaxially with respect to each other, and a rockable bracket for mounting one of said members for swinging movements relative to the other member to bring about different degrees of eccentricity between said members.

HARRY GUNN FLORY.
SAMUEL GEORGE COLEY.